(12) United States Patent
Nardone et al.

(10) Patent No.: US 10,113,086 B2
(45) Date of Patent: *Oct. 30, 2018

(54) EXPANDABLE TAPE

(71) Applicants: Susan Nardone, Lexington, MA (US); Charles Nardone, Lexington, MA (US)

(72) Inventors: Susan Nardone, Lexington, MA (US); Charles Nardone, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,251

(22) Filed: Aug. 8, 2017

(65) Prior Publication Data

US 2017/0335140 A1    Nov. 23, 2017

Related U.S. Application Data

(63) Continuation of application No. 14/816,419, filed on Aug. 3, 2015, now Pat. No. 9,758,700.

(51) Int. Cl.
| | | |
|---|---|---|
| *C09J 7/00* | (2018.01) | |
| *E04G 21/30* | (2006.01) | |
| *C09J 7/02* | (2006.01) | |

(52) U.S. Cl.
CPC .............. *C09J 7/02* (2013.01); *C09J 7/026* (2013.01); *E04G 21/30* (2013.01); *C09J 2201/28* (2013.01)

(58) Field of Classification Search
CPC ... C09J 7/00; C09J 7/02; Y10T 428/14; Y10T 428/1476; Y10T 428/28; A47G 1/17; A47G 1/175; E04F 15/14; E04G 21/24; E04G 21/241; E04G 21/242; E04G 21/243; E04G 21/245; E04G 21/246; E04G 21/247; E04G 21/28; E04G 21/30; A47H 21/00; A47H 2201/00

See application file for complete search history.

(56) References Cited

U.S. PATENT DOCUMENTS

| | | | |
|---|---|---|---|
| 4,425,744 A | 1/1984 | Villareal | |
| 5,089,329 A | 2/1992 | de Vrieze et al. | |
| 5,103,593 A | 4/1992 | McNaughton | |
| 5,379,557 A | 1/1995 | Kotter | |
| 5,437,428 A * | 8/1995 | Mirza | A47G 1/17 24/683 |
| 6,021,839 A | 2/2000 | Knezevich et al. | |
| 6,408,597 B1 | 6/2002 | Weder | |
| 6,546,681 B1 | 4/2003 | Trundle | |
| 8,241,721 B2 | 8/2012 | Deiss | |
| 9,758,700 B2 * | 9/2017 | Nardone | C09J 7/02 |
| 2006/0059747 A1 * | 3/2006 | Wescott | G09F 7/12 40/594 |
| 2013/0081764 A1 | 4/2013 | Yamanaka et al. | |

FOREIGN PATENT DOCUMENTS

| | | | | |
|---|---|---|---|---|
| EP | 0752239 | | 1/1997 | |
| EP | 0807472 A2 | | 11/1997 | |
| GB | 2240289 A | | 7/1991 | |
| WO | WO 9937729 A1 * | | 7/1999 | A47G 1/175 |

* cited by examiner

*Primary Examiner* — Catherine A. Simone
(74) *Attorney, Agent, or Firm* — Lambert & Associates; Gary E. Lambert; David J. Connaughton, Jr.

(57) ABSTRACT

A widthwise expandable tape is provided, the tape having a first adhesive side, a second adhesive side, and a flexible region between the two. The tape is adapted to be expandable and contractable in a widthwise direction.

15 Claims, 3 Drawing Sheets

EXPANDABLE TAPE

BACKGROUND OF THE INVENTION

Field of the Invention

The present invention relates generally to adhesive devices. More particularly, the present invention relates to a widthwise expandable tape.

Description of Related Art

During many interior construction, manufacturing, and/or maintenance projects, it is often desirable to tape up plastic or other protective sheeting to walls, ceilings, floors, other sheets, and the like. This serves to isolate certain areas from dust, paint, dust, and other material that may spread during the work. This sheeting is often difficult to hold in place, especially for an extended period of time. This difficulty can be caused by wind or other air flow in the interior (even the opening and closing of a door), as well as bumping the sheets, stepping on them, pushing them to the side when entering/exiting the sheeted area, and the like. In these cases, the plastic sheeting can be pulled away from the tape and will fall off, causing either the spread of the undesirable material, or a stoppage in work to re-apply the plastic sheet.

Therefore, what is needed is a device that may allow plastic sheeting and other material to be taped up in a work area that may also provide a resilience against movement to keep the taping attached.

SUMMARY OF THE INVENTION

The subject matter of this application may involve, in some cases, interrelated products, alternative solutions to a particular problem, and/or a plurality of different uses of a single system or article.

In one aspect, a widthwise expandable tape is provided. The tape has a first adhesive strip defining one lengthwise edge of the widthwise expandable tape, and a second adhesive strip defining the other lengthwise edge of the widthwise expandable tape. Adhesive is disposed on a bottom face of each strip. A flexible region joins the first and second strip such that they are parallel, or at least approximately parallel (at an angle less than 45 degrees to each other) when at rest. The flexible region is adapted to allow a movement of the second adhesive strip with respect to the first adhesive strip upon an application of a force to one of the strips.

In another aspect, a protective hanging system in a room of a building is provided. The system comprises a wall, and a sheet, the wall and sheet being connected together by a widthwise expandable tape. The tape has a first adhesive strip defining one lengthwise edge of the widthwise expandable tape, and a second adhesive strip defining the other lengthwise edge of the widthwise expandable tape. Adhesive is disposed on a bottom face of each strip. A bellows-shaped flexible region joins the first and second strip such that they are parallel or at least approximately parallel when at rest. The flexible region is adapted to allow a movement of the second adhesive strip with respect to the first adhesive strip upon an application of a force to one of the strips. In varying embodiments, the flexible region may deform slightly under a weight of the plastic sheets, or may be resilient enough to support the sheet without deformation.

In yet another aspect, a widthwise expandable tape wrapped about a roll and packaged is provided. The tape has a first adhesive strip defining one lengthwise edge of the widthwise expandable tape, and a second adhesive strip defining the other lengthwise edge of the widthwise expandable tape. Adhesive is disposed on a bottom face of each strip. A bellows-shaped flexible region joins the first and second strip such that they are parallel or at least approximately parallel when at rest. The flexible region is adapted to allow a movement of the second adhesive strip with respect to the first adhesive strip upon an application of a force to one of the strips. The tape is wrapped and rolled around, for example, a spool, having a first portion of the tape over a second portion. In this embodiment, the tape can be efficiently packaged and distributed.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a tape having a first adhesive side, a second adhesive side, and a flexible region between the two. The tape is adapted to be expandable and contractable in a widthwise direction. In one embodiment, the flexible region may be a bellows structure allowing expansion and contraction.

In an embodiment of use, the tape may be used to connect plastic or similar protective sheets to walls, floors, ceilings, and the like for protecting an area during an interior construction, maintenance, manufacturing processes, and the like. The tape, by virtue of its widthwise expandability, more resiliently holds the sheets in place and can accommodate slight movement of the sheets without being pulled off a surface to which the tape is attached.

The tape of the present invention may be provided in any manner to a consumer. In a particular embodiment, the tape may be provided in a roll. In a further embodiment, the tape may be provided in a roll having a liner between the adhesive layer and a top of a tape layer below the liner.

The tape may be formed of any material capable of having an adhesive applied to a bottom portion, and capable of supporting two items adhered together. Examples of materials of which the tape may be made include, but are not limited to plastics, paper, metal, fabrics, elastomers, composites, and the like. Preferably, the flexible region may be made of a material capable of flexion, and/or capable of being pre-formed in a bellows profile.

The sheets which the tape contemplated herein is intended to be hung may vary in weight from approximately 0.5-5 pounds. As such, the tape flexible region is resilient enough to not substantially deform under a weight of the sheets. In most embodiments, multiple strips of the tape will be used to support a single sheet, such that while a single strip may deform under the weight of the entire sheet, it will only be supporting a portion of the sheet's weight.

Figure 1:
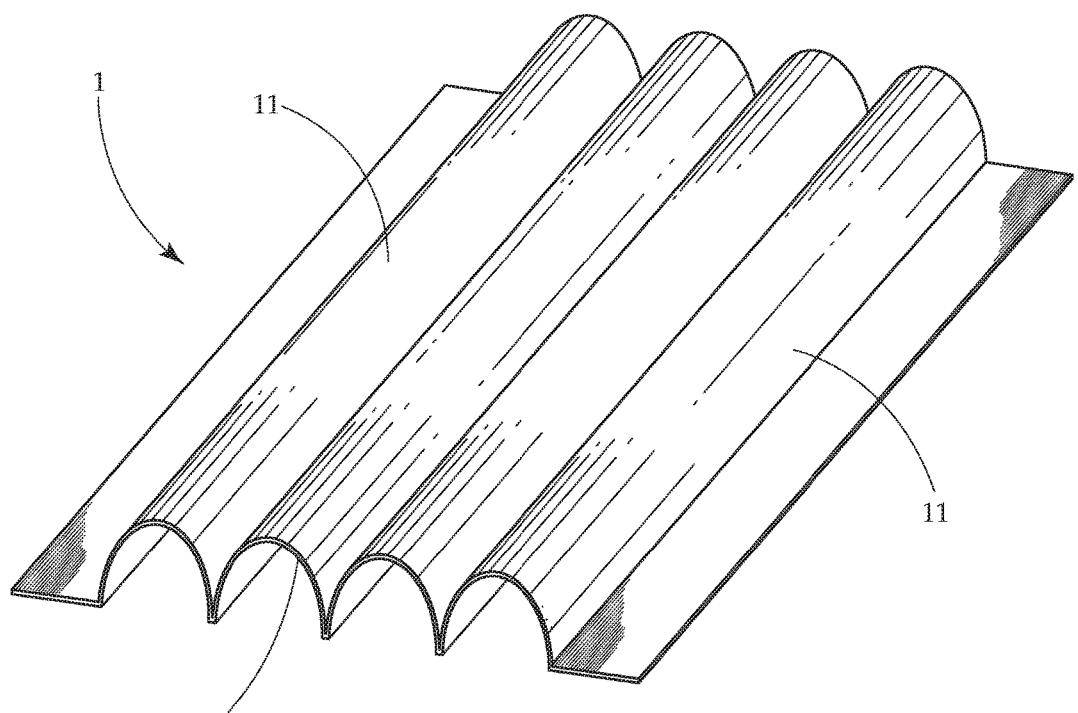
FIG. 1 provides a perspective view of an embodiment of the invention.

Turning now to FIG. 1, a perspective view of an embodiment of the expandable tape is shown. The tape 1 has two adhesive strips 11 on opposite widthwise ends of its body. These strips 11 are flat regions having an adhesive 12 disposed on a bottom surface thereof. Between the two strips 11, and connecting them together, is a flexible region 10. This flexible region 10 is shown in this figure as having a bellows profile. However, it should be understood that the flexible region may be formed in any manner allowing it to contract and expand in a widthwise direction, thereby allowing the adhesive strips 11, or portions thereof, to move towards and away from each other relative to the width of the tape 1.

Figure 2:
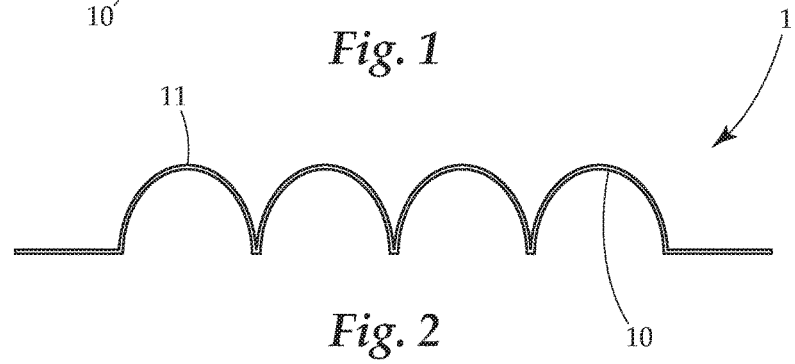
FIG. 2 provides a front view of an embodiment of the invention.
Figure 3:
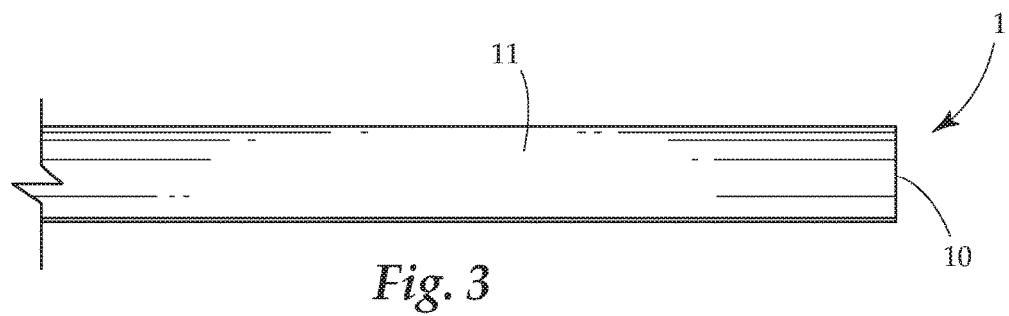
FIG. 3 provides a side view of an embodiment of the invention.
Figure 4:
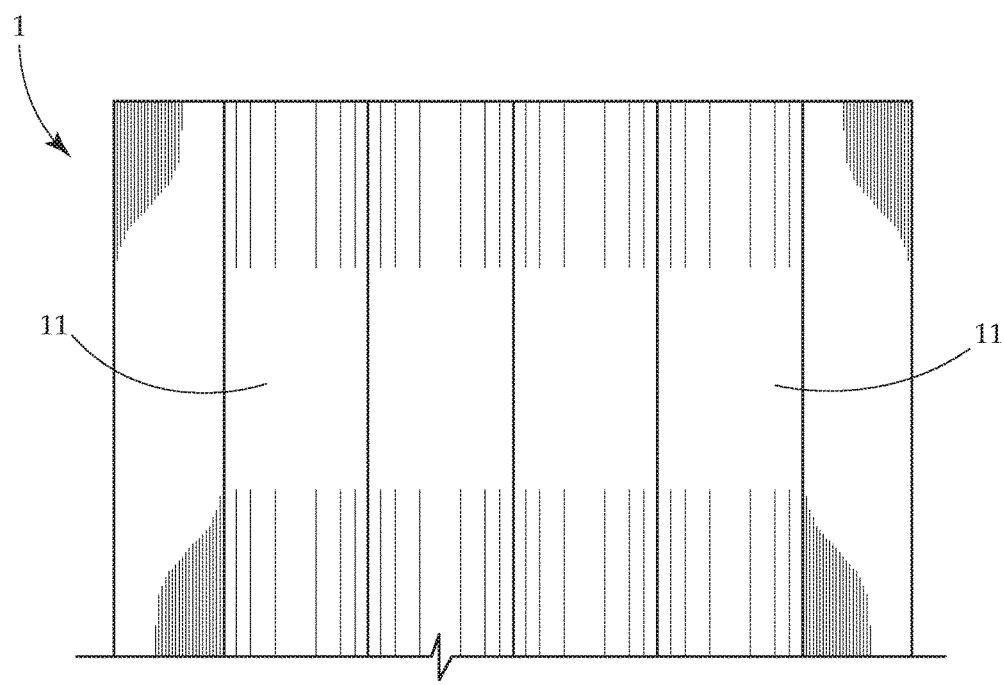
FIG. 4 provides a top view of an embodiment of the invention

FIGS. 2, 3, and 4 provide a frontal, side and top view, respectively, of an embodiment of the tape. As with FIG. 1, strips 11 are positioned on both sides of the tape, with the flexible region 10 connecting the two. This structure allows the adhesive strips 11 to move towards and away from each other relative to the width of the tape 1.

Figure 5:
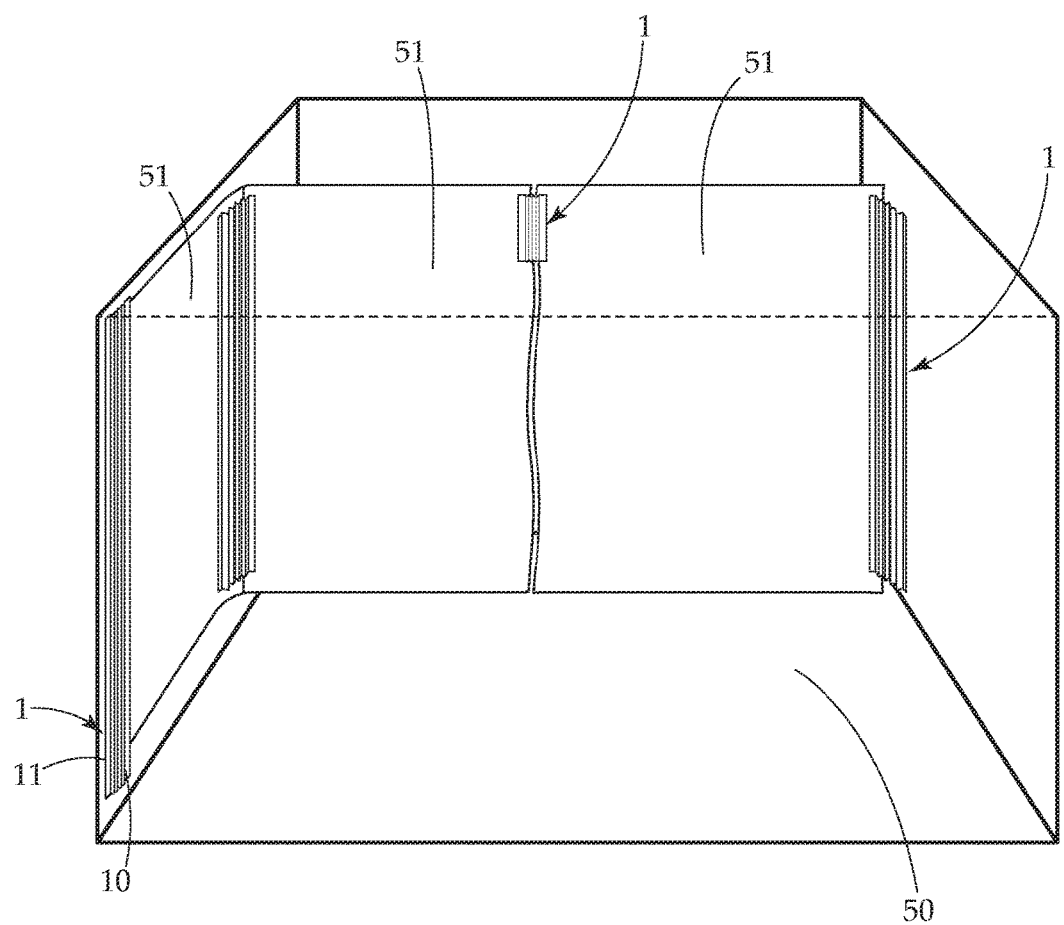
FIG. 5 provides a perspective view of a room having sheets held in place by an embodiment of the present invention.

FIG. 5 provides a perspective view of a room having a plurality of plastic sheets taped up around a work area using the tape of the present invention. The room 50 has sheets 51 blocking off an area of the room 50. This area is protected from dust, paint, particles, and the like. A number of tape strips 1 are used to connect the plastic sheets to the walls, and to each other. Each tape strip 1 comprises two of the adhesive strips, and the flexible region 10. Upon application of a force (be it wind, a contact, or otherwise), the flexible region 10 moves, allowing the strips and sheet to move to accommodate this force.

Figure 6:
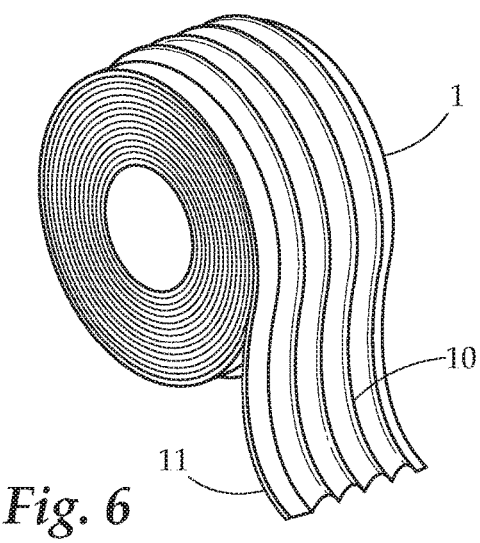
FIG. 6 provides a perspective view of an embodiment the present invention in a rolled form.

FIG. 6 provides a perspective view of the tape of the present invention on a roll. Roll 60 shows the tape in a rolled fashion, with the adhesive strips 11 aligned as well as the bellows-shaped flexible portion of this embodiment.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A hanging system in a room of a building comprising:
   at least one of a wall and a ceiling;
   a sheet; and
   wherein a first side of the sheet is connected to the at least one of the wall and the ceiling by a first widthwise expandable tape and a second widthwise expandable tape, wherein the first widthwise expandable tape is spaced apart from the second widthwise expandable tape, each of the first widthwise expandable tape and second widthwise expandable tape comprising:
   a first adhesive strip defining one lengthwise edge of the widthwise expandable tape;
   a second adhesive strip defining the other lengthwise edge of the widthwise expandable tape;
   a flexible region connecting the first adhesive strip to the second adhesive strip, the flexible region adapted to lengthen and contract to allow a movement of the second adhesive strip away from and towards the first adhesive strip in a widthwise direction of the widthwise expandable tape upon an application of a force to at least one of the first adhesive strip and the second adhesive strip;
   wherein the first widthwise expandable tape comprises a first quantity of adhesive on a bottom face of the first adhesive strip, and comprises a second quantity of adhesive disposed on a bottom face of the second adhesive strip, the bottom face of the second adhesive strip facing a same direction as the bottom face of the first adhesive strip.

2. The hanging system of claim 1 further comprising a third piece of the widthwise expandable tape connecting the sheet to one of a second wall, the ceiling, a floor, and a second sheet.

3. The hanging system of claim 1 wherein the first widthwise expandable tape flexible region is formed having a bellows shape which is configured to lengthen and contract along the bellows shape in response to the force applied to at least one of the first adhesive strip or the second adhesive strip.

4. The hanging system of claim 1 wherein the first adhesive strip and second adhesive strip of the first widthwise expandable tape are substantially parallel when at rest.

5. The hanging system of claim 1 wherein the first and second widthwise expandable tapes allow a force applied to the sheet to be transferred to at least one of the first and second tape flexible portion.

6. The hanging system of claim 1 wherein the sheet is a plastic sheet.

7. The hanging system of claim 1 wherein the flexible region of the first widthwise expandable tape is adapted to allow a movement of the second adhesive strip with respect to the first adhesive strip upon an application of the force greater than approximately 0.5 lb to at least one of the first adhesive strip and the second adhesive strip.

8. The hanging system of claim 3 wherein the bellows of the tape are rounded.

9. The hanging system of claim 3 wherein the bellows of the tape are angled.

10. The hanging system of claim 1 wherein a spacing between the first widthwise expandable tape and the second widthwise expandable tape allows for a spacing between the sheet and the at least one of the wall and the ceiling allowing a passage of air between the sheet and the at least one of the wall and the ceiling.

11. A tape assembly for use in a room of a building comprising:
    a sheet; and
    a first widthwise expandable tape, and a second widthwise expandable tape each comprising:
    a first adhesive strip defining one lengthwise edge of the widthwise expandable tape;
    a second adhesive strip defining the other lengthwise edge of the widthwise expandable tape;
    a flexible region connecting the first adhesive strip to the second adhesive strip, the flexible region adapted to lengthen and contract to allow a movement of the second adhesive strip away from and towards the first adhesive strip in a widthwise direction of the widthwise expandable tape upon an application of a force to at least one of the first adhesive strip and the second adhesive strip;

wherein the first adhesive strip of each of the first and second widthwise expandable tape is connected to the sheet, wherein the first widthwise expandable tape is spaced apart from the second widthwise expandable tape;

wherein the first widthwise expandable tape comprises a first quantity of adhesive on a bottom face of the first adhesive strip, and comprises a second quantity of adhesive disposed on a bottom face of the second adhesive strip, the bottom face of the second adhesive strip facing a same direction as the bottom face of the first adhesive strip; and wherein the first widthwise expandable tape flexible region is formed having a bellows shape which is configured to lengthen and contract along the bellows shape in response to the force applied to at least one of the first adhesive strip or the second adhesive strip.

12. The tape assembly of claim 11 wherein the second adhesive strip of the first widthwise expandable tape is connected to one of a wall, a ceiling, and a second sheet.

13. The tape assembly of claim 12 wherein the first and second widthwise expandable tapes allow a force applied to the sheet to be transferred to at least one of the first and second tape flexible portion.

14. The tape assembly of claim 11 wherein the first adhesive strip and second adhesive strip of the first widthwise expandable tape are substantially parallel when at rest.

15. The tape assembly of claim 11 wherein the flexible region of the first widthwise expandable tape is adapted to allow a movement of the second adhesive strip with respect to the first adhesive strip upon an application of the force greater than approximately 0.5 lb to at least one of the first adhesive strip and the second adhesive strip.

* * * * *